Figure 1:
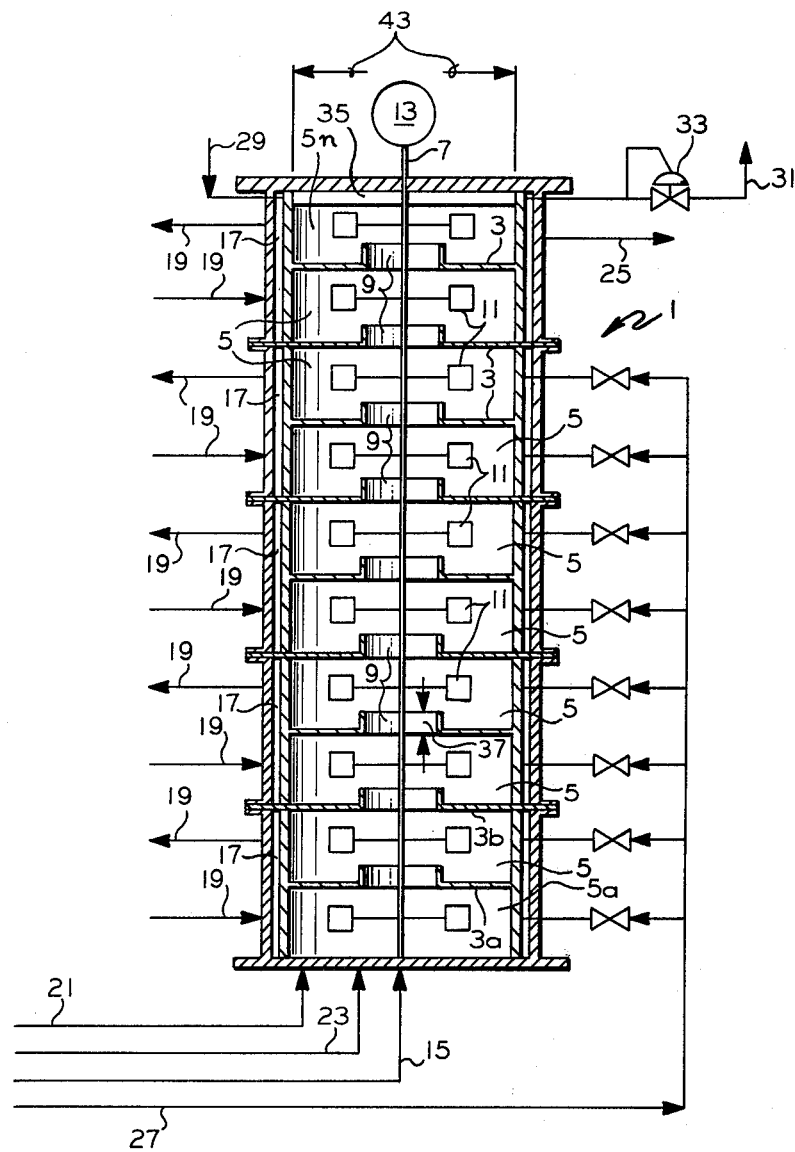

United States Patent [19]

Vidaurri et al.

[11] 4,370,470

[45] Jan. 25, 1983

[54] MULTISTAGE, AGITATED CONTACTOR AND ITS USE IN CONTINUOUS PRODUCTION OF ARYLENE SULFIDE POLYMER

[75] Inventors: Fernando C. Vidaurri, Borger, Tex.; Kenneth L. Anderson, Bartlesville, Okla.

[73] Assignee: Phillips Petroleum Company, Bartlesville, Okla.

[21] Appl. No.: 254,679

[22] Filed: Apr. 16, 1981

[51] Int. Cl.³ .............................................. C08G 75/14
[52] U.S. Cl. ..................................... 528/388; 422/134
[58] Field of Search .......................................... 528/388

[56] References Cited

U.S. PATENT DOCUMENTS

| | | | |
|---|---|---|---|
| 2,029,688 | 12/1932 | Wilson | 196/13 |
| 2,053,876 | 9/1936 | Pfau et al. | 259/9 |
| 2,804,379 | 8/1957 | Wistrich et al. | 23/270.5 |
| 3,212,859 | 10/1965 | Mitacek | 23/283 |
| 3,377,139 | 4/1968 | MacGregor et al. | 23/285 |
| 3,378,245 | 4/1968 | Frank | 263/21 |
| 3,881,871 | 5/1975 | Porter | 366/348 |
| 4,060,520 | 11/1977 | Irvin | 260/79.1 |
| 4,065,105 | 12/1977 | Lussiez et al. | 260/79 |
| 4,066,632 | 1/1978 | Anderson et al. | 260/79.1 |

Primary Examiner—Melvyn I. Marquis

[57] ABSTRACT

A contacting apparatus that is a vertically elongated, cylindrical shell having closed ends and separated by horizontal baffle plates into a multiplicity of discrete chambers with access from one chamber to another through concentric circular holes, axially centered in the baffles with a continuously rotatable shaft extending concentric with the baffles within the shell with at least one agitator means attached to the shaft positioned in each chamber and with the shaft in the circular openings providing annular openings in the baffles such the the ratio of backflow rate to feed rate through the openings is less than 1.5.

A method for continuously producing arylene sulfide polymer in which reactants suitable for producing poly-(arylene sulfide) are introduced into at least a first chamber of the contacting vessel described above thereby forming a reaction mixture which is passed through the chambers of the contactor while maintaining each chamber within conditions for producing arylene sulfide polymer and recovering arylene sulfide polymer from a chamber removed from the chamber into which the initial reactants are introduced.

14 Claims, 2 Drawing Figures

MULTISTAGE, AGITATED CONTACTOR AND ITS USE IN CONTINUOUS PRODUCTION OF ARYLENE SULFIDE POLYMER

BACKGROUND OF THE INVENTION

This invention relates to the production of arylene sulfide polymer. More particularly, this invention is related to the production of phenylene sulfide polymer. In one of its aspects, this invention is related to the continuous production of arylene sulfide polymer and more particularly, such production using a single contact vessel. In another aspect this invention is related to a contact vessel suitable for the continuous production of arylene sulfide polymer.

In one concept of this invention, it relates to the continuous production of arylene sulfide polymer by passing the reactants through multiple chambers in a single contact vessel, thereby limiting mechanical difficulties encountered in the use of multivessel continuous polymerization processes.

Processes for producing arylene sulfide polymers are well known as shown in U.S. Pat. Nos. 3,354,129 and 3,919,177. Although the production of arylene sulfide polymer, or more specifically, phenylene sulfide polymers, has generally been limited to batch operations in the processes described in the patents noted above, there have been methods proposed for the continuous production of arylene sulfide polymer as described in U.S. Pat. Nos. 4,056,515, 4,060,520 and 4,066,632, in which multiple vessels are employed in the polymerization process. The use of multiple vessels has, however, not been entirely satisfactory because the mechanical problems associated with agitated contact vessels are, in actual practice, multiplied by the number of vessels necessary for use in the reaction process. Processes which produce solid particulate material in liquid-full vessels are notorious for the problems associated with the bearings and seals of the mechanical agitators necessary in the processes. The development of a continuous process for the production of arylene sulfide polymer which requires only one agitated contact or in the polymerization process instead of multiple vessels is an important advance in the art.

The development of an apparatus suitable for the continuous production of arylene sulfide polymer in a single vessel has depended largely on the determination of the parameters necessary to provide control of the back-mixing between chambers or stages of a continuous reactor in the production of arylene sulfide polymer. It has now been found that for an elongated vertical reactor divided into chambers and having a central agitator shaft extending the length of the reactor the relationship between the diameter of the shaft and the diameter of the circular opening in each baffle around the shaft along with the relationship of the diameter of the horizontal baffle to the length of the annular path, i.e., the height of the vertical portion of the baffle surrounding the agitator shaft can be adjusted to provide a minimizing of backflow between the chambers necessary for arylene sulfide polymer production.

It is therefore an object of this invention to provide an apparatus for the continuous contacting of reactants to produce arylene sulfide polymer in a single agitated vessel. It is also an object of this invention to provide a method for continuously producing arylene sulfide polymer in which a single agitated contactor is used for conducting the reaction that produces the arylene sulfide polymer. It is another object of this invention to provide an economical method for producing arylene sulfide polymer. It is still another object of this invention to provide a method for substantially reducing the probability of mechanical problems in the equipment used in the presently known continuously methods for producing arylene sulfide polymer.

Other aspects, objects, and the various advantages of this invention will become apparent upon studying the specification, the drawings, and the appended claims.

STATEMENT OF THE INVENTION

According to this invention, an apparatus is provided that is a vertically, elongated, cylindrical shell having closed ends and internally separated by horizontal baffle plates into a multiplicity of discrete chambers with access from one chamber to another through openings in the baffles, usually concentric, circular openings axially centered; equipped with a continuously rotatable shaft extending concentric with the baffles within the shell with at least one agitator means attached to the shaft and positioned in each chamber, and with the shaft in relationship to the circular opening of each baffle to provide an annular opening such that the ratio of backflow rate to feed rate through the opening is less than 1.5:1. Preferably, the ratio of backflow rate to feed rate through each opening is in the range of about 0.01:1 to about 1.1:1. This would correspond to the operation of a contactor at an overall efficiency in the range of about 98 percent to about 30 percent with the overall percent efficiency of the contactor described by the following formula:

$$\text{Percent Efficiency} = \frac{\text{Equivalent Number of Perfect Stages} - 1}{\text{Actual Stages} - 1} \times 100.$$

The equivalent number of perfect stages can be determined by physical measurement in an operating system by dividing the square of the average residence time in the system by the variance of the exit residence time distribution curve factor thereby indicating how many perfectly functioning stages would be required to duplicate the results of the actual functioning system. This description of percent efficiency allows inclusion of a full zero to 100 percent range of efficiency for the contactor.

In a further embodiment of this invention the desired range of ratios of backflow rate to feed rate through the openings in the baffles is maintained by providing an apparatus in which the ratio of the diameter of the circular opening in the baffles to the diameter of the shaft of the agitator passing through the opening is in the range of about 1.1:1 to about 2.1:1 and the ratio of the diameter of the circular opening in the baffle plate to the annular path length of the baffle plate is in the range of about 35:1 to about 3:1. The annular path length of the baffle plate is defined as the height of the riser section of the baffle surrounding the agitator shaft where the shaft passes through the baffle. When the baffle is made of relatively thick material, this can be the thickness of the baffle itself, or when the baffle is made of thin material, this can be a cuff or rim perpendicular to the horizontal portion of the baffle and surrounding the shaft.

In another embodiment of the invention the ratio of the back flow rate and the feed rate through the opening in the baffles is maintained by providing baffles in which the ratio of the annular area of the opening around the shaft to the total cross-sectional area of the contactor is about 0.002:1 to about 0.02:1 and maintaining a feed rate to the contactor that develops annular axial velocities of about 0.1 to about 10 cm/sec.

In a further embodiment of the invention reactants suitable for producing poly(arylene sulfide) are introduced into at least a first chamber of a contacting vessel having parameters as described above thereby forming a reaction mixture which is then passed through the chambers of the contactor while maintaining each chamber within conditions for producing arylene sulfide polymer and recovering arylene sulfide polymer from a chamber in the contactor removed from the chamber into which the initial reactants are introduced.

In an embodiment of the invention in which the reactants are fed through the contactor in upward flow, the flow in the region between the rotating shaft and the annulus wall falls into a pattern in which (1) near the shaft sufficient angular velocity is imparted to particulate matter, if present, that it is slung outward from the shaft toward (2) the central portion of the region between the shaft and annulus wall in which the vertical component of flow predominates to provide maximum upward transport of particles, which in (3) the position nearest the annulus wall there is insufficient vertical flow component to transport larger particles upward so that they tend to settle slowly against the lower velocity upward flowing liquid. Naturally, the faster the rotation of the shaft the greater the angular velocity of particles and the greater the distance from the shaft they are slung into the area of upward flow thereby interfering with the upward flow.

In the portion of the annulus nearest the annulus wall frictional drag provides an obstacle to the upward flow. There is created a central area removed from both the annulus wall and from the shaft in which the vertical component predominates which is effective for upward transport of particles.

At any given agitator speed the region in which tangential velocity interferes with the vertical component can be offset by increasing the distances between the shaft and the annulus wall. There is a limit to this compensation, however, because the larger the area of vertical component dominance the lower the upward velocity. A certain velocity is required to transport a particle of certain size upward. Lower upward velocity, therefore allows larger backflow and lowers the efficiency of the stages. There is an optimum distance between shaft and annulus wall for given agitator speed and particle size to provide both low back mixing and adequate upward transport of solids.

The conditions for optimizing upflow of solids are set herein as providing sufficient distance between the rotatable shaft and the baffle plate annulus wall to assure upward transport of particulate matter at a specific of annular velocity while maintaining the ratio of backflow rate to feed rate through any annulus a 1.5:1 or less, preferably about 0.01:1 to about 1.1:1, as discussed above or with an overall efficiency of the contactor in a range of about 98 percent to about 30 percent. Conditions to provide upflow of particulate matter will fall within the limits previously described for maintaining a desirable ratio of backflow to feed rate, since these limits should be met whether the flow is upward or downward in the contactor.

In the process of the invention a polyhalo-substituted aromatic compound (arylene halide) is contacted in an apparatus as described above with either a sulfur-containing complex formed by the reaction of a suitable sulfur source, an alkaline metal hydroxide, at least one organic amide and, optionally, at least one polymerization modifying compound or with the reactants necessary to produce such a sulfur-containing complex. When the sulfur-containing complex is not completely formed prior to being introduced into the contactor as a reactant the reactants necessary to produce the complex can be introduced individually into the contactor or some of them may be pre-reacted to produce other compounds that are introduced as reactants into the contactor.

In general, the reactions for producing arylene sulfide polymers that are well known in batch reactions can be adapted for use in the the continuous process of this invention. Many of the batch processes are carried out over an extended period of time by increasing the reaction temperature in stages until the desired polymerization is accomplished. Using the apparatus of the present invention with means for individually controlling the temperature of the reaction chambers the passage of the reactants through the multiple chambers can be viewed as an extension of the reaction through space as well as time. Movement of the reactants through chambers held at successively higher temperatures effectively accomplishes the results of holding the reactants in a single chamber and increasing the temperature on that chamber.

The apparatus and continuous process described herein can be used both in processes in which the polyhalo-substituted compounds are p-dihalo-benzenes, polyhaloaromatic compounds having more than two halogen substituents per molecule, or combinations of these compounds. Processes such as that set forth in U.S. Pat. No. 4,089,847 are well adapted to the present apparatus which can provide for a p-dihalobenzene as initial reactant with a subsequent addition of a polyhaloaromatic compound having more than two halogens in later chambers in the series.

Any polyhalo-substituted aromatic compound (arylene halide) can be employed, including the broad group of primary reactants, incorporated herein by reference, described in Edmonds, U.S. Pat. No. 3,354,129, issued Nov. 21, 1967. Generally preferred polyhalo-substituted compounds are represented by the formulas:

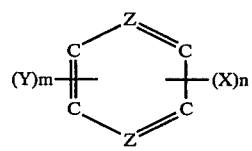

I

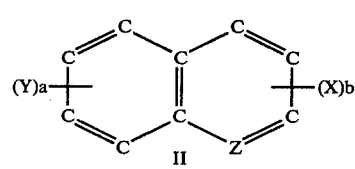

II

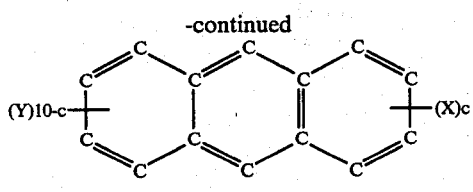

III

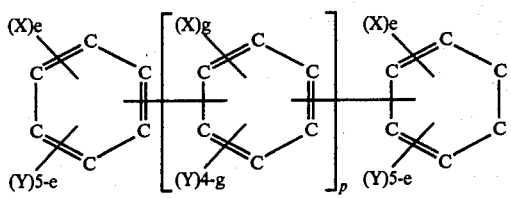

IV

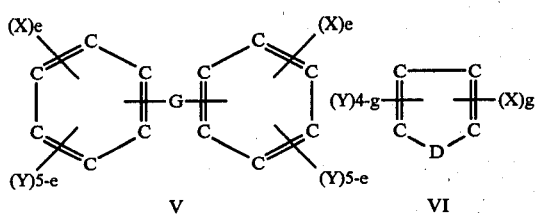

V  VI wherein each X is a halogen selected from the group consisting of chlorine, bromine, iodine, and fluorine, preferably chlorine and bromine, each Y is selected from the group consisting of hydrogen, —R, —N(R)$_2$ $$-\overset{O}{\underset{}{\overset{\|}{C}}}-OR,\ -\overset{O}{\underset{}{\overset{\|}{C}}}-OM,\ -\overset{O}{\underset{}{\overset{\|}{C}}}-N(R)_2-\overset{R}{\underset{}{N}}-\overset{O}{\underset{}{\overset{\|}{C}}}-R'$$

—O—R′, —S—R′, —SO$_3$H, and —SO$_3$M, wherein each —R is selected from the group consisting of hydrogen and alkyl, cycloalkyl, aryl, aralkyl, and alkaryl radicals containing from 1 to 12 carbon atoms, inclusive; each R′ is selected from the group consisting of alkyl, cycloalkyl, aryl, aralkyl and alkaryl radicals containing from 1 to 12 carbon atoms, inclusive; each Z is selected from the group consisting of —N= and —C=; D is selected from the group consisting of —O—, —S—, and

G is selected from group consisting of

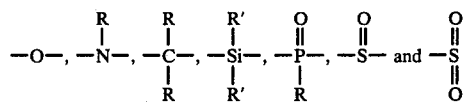

M is an alkali metal selected from the group consisting of sodium, potassium, lithium, rubidium, and cesium; n is a whole integer of from 2 to 6, inclusive; when both Z's in Formula I are —C=, m=6-n, when one Z in Formula I is —C=, m=5-n, when both Z's in Formula I are —N=, m=4-n; b is a whole integer of from 2 to 8 inclusive, when Z in Formula II is —C=, a=8-b, when Z in Formula II is —N=, a=7-b, c is a whole integer of from 2 to 10 inclusive, e is a whole integer of from 1 to 5, inclusive, g is a whole integer of from 2 to 4, inclusive, and p is a whole integer selected from the group consisting of 0 and 1.

The compounds of the above general formulas which are preferred are those which contain not more than three halogen atoms, and more preferably are dihalo-substituted compounds.

Representative arylene halide reactants are the following compounds: 1,2-dichlorobenzene, 1,4-dichlorobenzene, 1,4,5-tribromobenzene, N,N-dimethyl-2,5-dibromoaniline; 1,2,4,5-tetrabromobenzene, hexachlorobenzene, 1,3,5-trichloro-2,4,6-triphenylbenzene, 1,2,4-trichlorobenzene, methyl 2,5-dichlorobenzoate, 2,5-dichlorobenzamide, 1,4-dibromonaphthalene, 4,4′-dichlorobiphenyl, 3,4-dibromothiophene, 3,4-dichlorofuran, 3,4-difluoropyrrole, 2,5-dichloropyridine, sodium 2,5-dibromobenzenesulfonate, p,p′-dichlorodiphenyl ether; 3,3′-dichlorodiphenyl dimethylsilane; di(2-methyl-4-bromophenyl) sulfoxide, methyl di(3-ethyl-4-chlorophenyl) phosphite, 4-bromophenyl 3-n-butyl-4-chlorophenyl sulfone, and 2,6-dichloropyrazine. Because of their ready commercial availability and/or superior product preferred polyhalo-substituted aromatic compounds include 1,2-dichlorobenzene, 1,3-dichlorobenzene, and 1,2,4-trichlorobenzene. The monomers p-dichlorobenzene, and 4,4′-dichlorobiphenyl produce especially useful arylene sulfide polymers and are therefore presently preferred polymer reactants in accordance with this invention.

The organic amides for use in the process of this invention should be substantially liquid at the reaction temperatures and pressures employed. The amides can be cyclic or acyclic and can have 1 to about 10 carbon atoms per molecule. Examples of some suitable amides include formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, ε-caprolactam, N-methyl-ε-caprolactam, N,N′-ethylenedi-2-pyrrolidone, hexamethylphosphoramide, tetramethylurea, and the like, and mixtures thereof.

Alkali metal aminoalkanoates which can be employed in the process of this invention can be represented by the formula R$_2$N(CR$_2$)$_n$CO$_2$M, wherein each R is selected from the group consisting of hydrogen and hydrocarbyl radicals selected from alkyl, cycloalkyl, and aryl, and combinations thereof such as alkaryl, aralkyl and the like, the number of carbon atoms in each of said hydrocarbyl radicals being within the range of one to about 12, M is an alkali metal selected from lithium, sodium, potassium, rubidium and cesium, n is an integer having a value of 1 to about 12, and the total number of carbon atoms in each molecule of the alkali metal aminoalkanoate is within the range of two to about 24.

Examples of some alkali metal aminoalkanoates which can be employed include lithium aminoacetate, sodium N,N-dimethyl-2-aminoproprionate, potassium N-ethyl-3-cyclopentyl-3-aminopropionate, sodium N-methyl-4-aminobutyrate, sodium N-methyl-6-aminohexanoate, rubidium N-isopropyl-3-phenyl-5-aminopentanoate, cesium N-butyl-N-cyclohexyl-3-isopropyl-6-aminohexanoate, potassium N-phenyl-3-butyl-7-aminooctanoate, sodium N-cyclopentyl-4-hexyl-10-aminodecanoate, lithium N-hexyl-6-pentyl-13-aminotridecanoate, sodium N-decyl-4-aminododecanoate, potassium N-nonyl-2-aminotetradecanoate, sodium N-o-tolyl-3-amino-4-phenylbutyrate, rubidium N,N-dibenzyl-2-p-tolyl-3-aminopropionate, cesium 4-aminobutyrate, sodium 5-aminopentanoate, potassium 6-aminohexanoate, and the like, and mixtures thereof.

Alkali metal hydroxides which can be employed in the process of this invention include lithium hydroxide, sodium hydroxide, potassium hydroxide, rubidium hydroxide, cesium hydroxide, and mixtures thereof. Although the alkali metal hydroxide can be employed in anhydrous form preferably it is employed in hydrated form and/or as an aqueous mixture, more preferably in the liquid state at the temperature of use. Although the water present with the alkali metal hydroxide can vary over a considerable range, generally the water will be present, as water of hydration and/or as free water, in an amount up to about 70 weight percent, preferably about 25 to about 60 weight percent, based on the total weight of alkali metal hydroxide plus water associated therewith.

Sulfur sources useful in the process are any of those that are well known in the production of arylene sulfide polymers, particularly, alkali metal sulfides, alkali bisulfides, and the sulfur sources listed in U.S. Pat. Nos. 3,884,884 and 3,919,177, among which are elemental sulfur, hydrogen sulfide, carbon disulfide, carbon oxysulfide, phosphorus pentasulfide, thiocarboxylates, thiocarboxylic acids, thiocarbonates, thiocarbamates, thioreas, thioamides, mercaptans, mercaptides, and the like.

Any alkali metal sulfide can be employed that can be represented by the formula $M_2S$ wherein M is an alkali metal selected from the group consisting of sodium, potassium, lithium, rubidium and cesium, including the anhydrous and hydrated forms of alkali metal sulfides. Generally preferred reactants are alkali metal sulfide polyhydrates, e.g., $Na_2S.6H_2O$, $K_2S.5H_2O$, $Rb_2S.4H_2O$, $CsS_2.4H_2O$ which can be readily dehydrated to alkali metal sulfide monohydrates, e.g., $Na_2S.H_2O$, $K_2S.H_2O$, $Rb_2S.H_2O$, by heating to elevated temperatures, e.g., approximately 400° F., in the presnce of a polar organic compound, e.g., N-methylpyrrolidone at atmospheric pressures. Since dehydration of alkali metal sulfide polyhydrates, such as a presently preferred sodium sulfide reactant, to a hydrate from of less than 1 mol of water per mol of alkali metal sulfide is often difficult and/or uneconomical, presently it is preferred that alkali metal sulfide reactants contain about 1 mol of water of hydration.

Alkali metal bisulfides which can be employed in the process of this invention include lithium bisulfide, sodium bisulfide, potassium bisulfide, rubidium bisulfide, cesium bisulfide, and mixtures thereof. As stated above, the alkali metal bisulfide should be employed in hydrated form and/or as an aqueous mixture, preferably in the liquid state at the temperature of use. Although the water present with the alkali metal bisulfide can vary over a considerable range, generally the water will be present, as water of hydration and/or as free water, in an amount within the range of about 20 to about 60 weight percent, preferably about 25 to about 40 weight percent, based on the total weight of alkali metal bisulfide plus water associated therewith.

Among the most commonly used polymerization modifying compounds in the production of arylene sulfide polymer are the alkali metal carboxylates. Alkali metal carboxylates which can be employed in the process of this invention can be represented by the formula $R''CO_2M$, where $R''$ is a hydrocarbyl radical selected from alkyl, cycloalkyl, and aryl, and combinations thereof such as alkaryl, aralkyl, and the like, the number of carbon atoms in said $R''$ being within the range of 1 to about 20, and M is an alkali metal selected from lithium, sodium potassium, rubidium, and cesium. If desired, the alkali metal carboxylate can be employed as a hydrate or as a solution or dispersion in water.

Examples of some alkali metal carboxylates which can be employed in the process of this invention include lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyloctanoate, potassium dodecanoate, rubidium 4-ethyl-tetradecanoate, sodium octanoate, sodium heneicosanoate, lithium cyclohexane-carboxylate, cesium cyclododecanecarboxylate, sodium 3-methylcyclopentane-carboxylate, potassium cyclohexylacetate, potassium benzoate, lithium benzoate, sodium benzoate, potassium m-toluate, lithium phenylacetate, sodium 4-phenyl-cyclohexanecarboxylate, potassium p-tolylacetate, lithium 4-ethylcyclohexyl-acetate, and the like, and mixtures thereof.

The invention can best be understood by reference to the drawing in which

Figure 2:
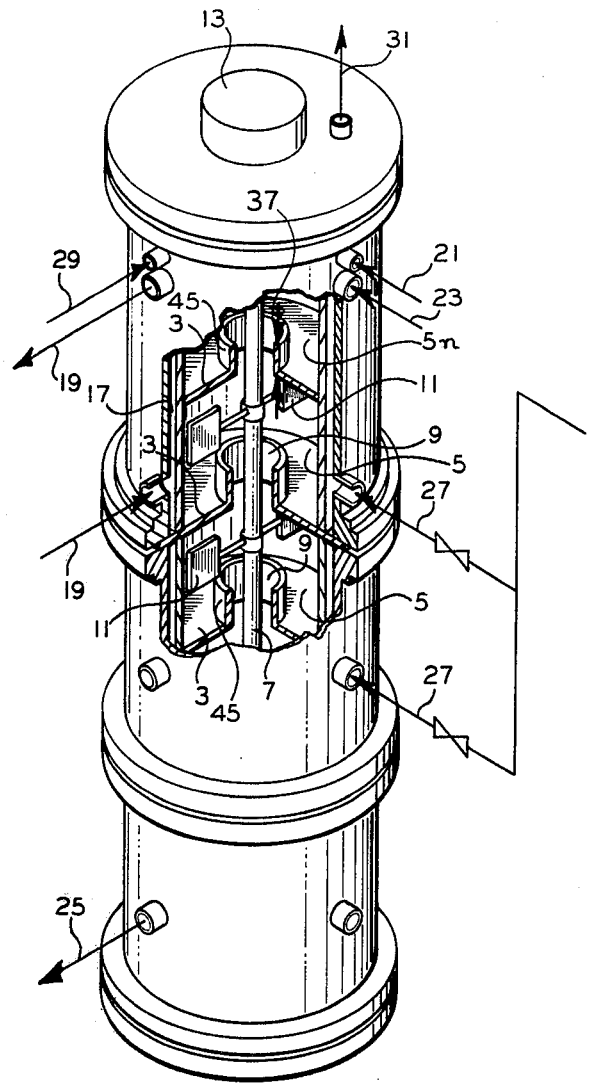

FIG. 1 is a diagrammatic section of the contacting apparatus of this invention and FIG. 2 is a perspective view in partial section showing an arrangement of the internals of the contacting apparatus.

Referring now to FIG. 1, a cylindrical, vertically elongated shell, generally designated 1, serves as the contacting vessel which is divided by baffles 3 into a multiplicity of chambers 5 here illustrated as 10 discrete chambers. A rotatable shaft 7 passes axially through the vessel 1 concentric with a circular opening 9 in each of the baffle plates 3. In each of the chambers 5 an agitation means 11 such as a paddle wheel is fixedly attached to the rotatable shaft 7. The shaft passes through the upper wall of the vessel 1 and is attached therethrough to a drive means 13. At its lower end the shaft rests in a bearing which is provided with an external flush 15.

Heat transfer means can be provided for the individual sections of the contactor. Preferably, the shell of the vessel is jacketed in sections 17 with means 19 for providing heat exchange fluid through the jacket in an individually controlled manner so that individual sections of the vessel can be maintained at different temperatures.

Reactants are supplied either to the first chamber 5a at the bottom of the shell or, as illustrated in FIG. 2 to the first chamber 5n at the top of the shell through conduits 21, 23 with removal of product through conduit 25 located preferably in the chamber at the opposite end of the vessel from that into which feed is introduced, although product could be taken from any of the intervening chambers. Reactant, usually dihalobenzene, is introduced through conduit 27 into any of the chambers of the reactor although preferably not into the chamber from which product is removed. Although only conduits 21, 23 and 27 have been illustrated it should be evident that a multiplicity of feed lines can be employed into any of the chambers of the reactor.

Preferably, conduit means 29 introduces an inert gas into the reactor with a vent conduit 31 provided with pressure control 33 to maintain a gas cap 35 above the liquid level in the reactor. This gas cap provides protection from the particle containing liquid in the reactor for the agitator shaft 7 as it passes through the shell of the contactor. It is within the scope of this invention, however, to run the contactor liquid full.

As illustrated in FIG. 1 the baffles are discoids 3a firmly affixed to the interior of shell 1 or are discoids 3b extending through the flanges of the reactor shell.

The aspect upon which the operation of the present invention depends is the relationship of the size of the circular opening 9 in the baffles 3 both in respect to the annular space formed between the baffle 3 and the shaft 7 and the annular path length 37 (either figure) which can be described as the length of the annulus formed between the baffle 3 and the shaft 7. It is critical to the operation of the present invention that the ratio of the diameter 30 (FIG. 1) of the circular opening to the shaft diameter 7 (FIG. 2) be in the range of 1.1:1 and 2:1 and that the range of the ratio of the diameter of the horizontal baffle, i.e., the internal diameter of the vessel 43 (FIG. 1) to the height of the vertical riser, i.e., the annular path length 37 will be about 35:1 to about 3:1, preferably about 8:1 to about 3:1. It is also important that the circular opening diameter 9 in the baffle, the shaft diameter 7, and the internal diameter of the vessel 43 be designed within a relationship to give the annular area of the opening 9 around the shaft in a ratio to the total cross-sectional area of the contactor in a range from about 0.002:1 to about 0.02:1.

The view in FIG. 2 is presented mainly to illustrate through a perspective drawing, the annular path length 37 which is described as the length of the annulus formed between the baffle 3 and the shaft 7. As can be seen in FIG. 2 this annulus can be formed using a thin plate to form the baffle with the plate extended perpendicular to the horizontal baffle forming a lip 45 that elongates the circular opening 9. Using thicker baffle plates the thickness of the plate itself can be used to form the annular opening.

FIG. 2 also illustrates, using similar numbers to describe similar parts, that polymerization can be carried out using downflow through the contactor with feedstock entering through lines 21, 23, 27 and removal of product through line 25. Either the upflow, as illustrated in FIG. 1, or the downflow through the contactor, as illustrated in FIG. 2, can be equally effective.

Components used in the preparation of the poly(arylene sulfide) can be introduced in the contactor in any order, i.e., the process of the invention allows the introduction of additional reactants in later stages of the reaction. Water which can be present in any composite formed from any of the components or which can be present in any of the individual components can be removed, for example, by distillation, prior to conducting the polymerization reaction. In other words, water can be substantially absent at the beginning of the polymerization reaction or it can be present as free water and/or as water hydration in an amount up to about 1 g-mol per g-mol of p-dihalobenzene. Dehydration steps prior to the continuous reaction can be employed, if desired, to bring the amount of water present in any composite formed from any of the components within the limited expressed above.

The temperature at which the polymerization can be conducted can vary over a wide range and will generally be within the range for about 235° C. to about 450° C., and preferably from about 240° C. to about 350° C. The pressure need only be sufficient to maintain the p-dihalobenzene and any organic amides substantially in the liquid phase, and to retain the sulfur source within this liquid phase. The reaction time or residence time within the contactor can also be varied considerably but will generally fall within a range of about 2½ hours to about 4 hours.

It is critical to the operation of the invention that the ratio of backflow rate to feed rate through the openings in the baffle plates be less than 1.5:1. This ratio is a function of the various relationships of the diameter of the circular opening in each baffle, the diameter of the agitator shaft passing through the opening, the annular path length of the circular opening, and the internal diameter of the contactor. The relationships are also dependent on the viscosity of the reaction mixture and the throughput desired for the contactor. The relationships of these parameters have been determined experimentally for the production of poly(arylene sulfide) and have been set out above. By setting the maximum size of opening in the baffle plate to be relatively small in comparison to the capacity and throughput of the contactor the amount of backflow from a reaction chamber to the preceding chamber in the reaction train as compared to the forward feed rate can be kept within a desired minimum independent of whether there is upflow or downflow through the contactor.

The reaction of individual components or of compositions formed from the reaction of the several components which can serve as feedstock for the process are generally well known within the art. The poly(arylene sulfide) produced by the process of this invention can be separated from the reaction mixture by conventional procedures, for example, by filtration of the polymer followed by washing with water, or by dilution of the reaction mixture with water, followed by filtration and water-washing of the polymer. It is also within the scope of the invention to treat the reaction mixture within the contactor by contact with such substances as carbon dioxide to alter the physical properties of the polymer produced.

The poly(arylene sulfide) prepared by the process of this invention can be blended with fillers, pigments, extenders, other polymers or the like. It can be cured through cross-linking and/or chain extension, for example, by heating at temperatures up to about 480° C. in the presence of a free oxygen-containing gas to provide cured products having high thermal stability and chemical resistance. It is useful in the production of coatings, films, motive objects, and fibers.

In the examples of production of poly(arylene sulfide) that follow, the reactions were designed for use of a jacketed and insulated polymerization reaction having 10 stages, each with a stage diameter of 8 inches (20.3 cm) and a stage height of 12 inches (30.8 cm), a three horse power turbine agitator with an agitator blade assembly within each stage having an impeller diameter of 5.3 inches (12.7 cm), a shaft diameter of 1.25 inches (3.175 cm), each baffle containing a circular hole with a diameter of 1.45 inches (3.691 cm), an annular path length of 1.5 inches (3.81 cm), and with the contactor containing a total volume of 25 gal (96.5 liters).

The reactants were fed upflow through the contactor at a rate to produce 9.0 lbs of polymer per hour for a residence time in the contactor of 3.7 hours. The reactor was maintained at a temperature of 260° C. For these criteria the following reaction runs were completed.

EXAMPLE I

A complex solution of feedstock of 13.56 weight percent $Na_2S$ and 0.42 weight percent NaOH complexed in N-methylpyrrolidone (NMP) was prepared by reacting 336.55 lbs of an aqueous NaSH solution (containing 58.3 weight percent of NaSH) with 275.65 lbs of an aqueous solution of NaOH containing 50.67 weight percent NaOH which yielded 612.2 lbs Na$_2$S solution which was 44.62 weight percent Na$_2$S. This was then reacted with 1628.55 lbs NMP. The solution formed was then dehydrated at 17 psig at a temperature ranging from about 328° up to 460° F. thereby removing 283.6 lbs of water and 7.15 lbs of H$_2$S overhead. The dehydrated complex solution was fed at a rate of 47.87 lbs/hr (5.50 gph at 320° F.) along with p-dichlorobenzene at a rate of 13.2 lbs/hr (1.37 gph at 283° F.) into the base of the contactor to produce 9.0 lbs/hr of poly(arylene sulfide) overhead.

EXAMPLE II

In this example, SMAB feedstock was prepared by reacting 284.7 lbs of NaOH solution with 1732.5 lbs NMP with dehydration of 17 psig and temperature ranging from 320° to 400° F. to take 140.45 lbs of water overhead producing a solution of sodium-N-methyl-4-aminobutyrate (SMAB) in NMP. This SMAB solution was fed at a rate of 49.44 lbs/hr (5.73 gal/hr at 320° F.) along with p-dichlorobenzene at a rate of 13.2 lbs/hr (1.37 gal/hr at 283° F.) and NaSH 0.78H$_2$O at a rate of 5.83 lbs/hr (0.49 gal/hr at 320° F.) to the base of the contactor to produce 9.0 lbs/hr of poly(arylene sulfide).

Additionally the following example was calculated using the same conditions for reaction as in Example I and II.

EXAMPLE II

In this calculated example sodium-N-methyl-4-aminobutyrate solution feedstock is prepared by reacting 569.4 lbs in a NaOH solution with 1732.5 lbs of NMP with subsequent dehydration at 17 psig at a temperature ranging from 320° to 400° F. to take 280.9 lbs of water overhead. The sodium-N-methyl-4-aminobutyrate (SMAB) solution feedstock was fed at the rate of 48.03 lbs/hr (5.58 gal/hr at 300° F.) along with 13.20 lbs/hr (1.37 gal/hr a 283° F.) of p-dichlorobenzene and 2.83 lbs/hr of H$_2$S into the base of the contactor to produce 9.0 lbs/hr of poly(arylene sulfide).

To illustrate the effective size of the gap, or space, between the rotatable shaft and the annulus wall that is available in upflow conditions for various particle sizes of salt produced as a byproduct in the typical poly(arylene sulfide) reaction the following tables of data were calculated. Note that, as previously discussed, solid particles become a problem only in upflow conditions in the continuous reactor because, if the process conditions are not sufficient to carry all solids out through the upper outlet of the contactor, a buildup of solids sufficient to interupt operation of the reactor will eventually occur. The polymerization reactor had a clearance of 2.580 microns and a feedrate that gave an average annular axial velocity of 2.491 cm/sec. Using this feed rate calculations were made using the particle sizes and dimensions of the gap stated in the following tables.

TABLE I

| | 300 MICRON PARTICLE | | | | | |
|---|---|---|---|---|---|---|
| | 0 RPM | | 400 RPM | | 600 RPM | |
| | % Area Available for Vertical Transport | Effective Gap Microns | % Area Available for Vertical Transport | Effective Gap Microns | % Area Available for Vertical Transport | Effective Gap, Microns |
| 1500 micron Gap | 86.7 | 1300 | 58.7 | 875 | 37.1 | 550 |
| 2500 micron Gap | 68 | 1700 | 49.4 | 1225 | 30.4 | 750 |
| 3500 micron Gap | 42.7 | 1700 | 33.6 | 1375 | 14.6 | 700 |
| 4500 micron Gap - There is no vertical transport of a 300 micron particle. | | | | | | |

TABLE II

| | 250 MICRON PARTICLE | | | | | |
|---|---|---|---|---|---|---|
| | 0 RPM | | 400 RPM | | 600 RPM | |
| | % Area Available for Vertical Transport | Effective Gap Microns | % Area Available for Vertical Transport | Effective Gap Microns | % Area Available for Vertical Transport | Effective Gap, Microns |
| 1500 micron Gap | 90 | 1350 | 60.4 | 900 | 38.8 | 575 |
| 2500 micron Gap | 80 | 2000 | 55.5 | 1375 | 36.6 | 900 |
| 3500 micron Gap | 67.1 | 2350 | 46.6 | 1675 | 29.1 | 1000 |
| 4500 micron Gap | 53.4 | 2400 | 41.0 | 1825 | 20.5 | 900 |

The Tables above illustrate that for a given flow rate and shaft rotation as the gap becomes larger the percentage area effective for transporting upward solid particles of a given size becomes smaller. The actual area effective for upward transport of solids increases to a maximum and then decreases as the gap increases. Referring to both tables, note that a 4500 micron gap, particles of 300 micron size are not transported up while 250 micron particles are transported up in a much reduced area. Typical analysis of salt particles show, on an verage, the largest percentage fall within a size range of about 250 microns to about 420 microns. The annular velocity illustrated is sufficient to provide upflow of the particle sizes illustrated at any gap size below 3500 microns.

We claim:
1. A method for continuous preparation of arylene sulfide polymer comprising
   (1) introducing a polyhalo-substituted aromatic compound and a compound chosen from among the group consisting of (i) sulfur-containing complex produced from a suitable sulfur source, alkali metal hydroxide, at least one organic amide and, optionally, at least one polymerization modifying compound and (ii) suitable sulfur source, alkali metal hydroxide, a least one organic amide and, optionally, at least one polymerization modifying compound into at least a first chamber in a contacting apparatus comprising (A) a cyclindrical, vertically elongated shell having closed ends and separated by horizontal baffle plates into a multiplicity of discrete chambers with access from one chamber to another through concentric circular openings, axially centered in said baffles and (B) a continuous rotatable shaft extending concentric with said baffles within said shell with at least one agitator means attached thereto positioned in each chamber, said shaft and said circular openings providing annular openings such that the ratio of backflow rate to feed rate through the openings is less than 1.5:1.

(2) passing said reaction mixture through chambers of said contactor while maintaining each chamber within conditions for producing arylene sulfide polymers; and (3) recovering arylene sulfide polymer from a chamber of the contactor removed from the chamber in which the initial reactants were introduced.

2. A method of claim 1 in which said contacting apparatus is further characterized in that the ratio of the diameter of the circular openings to the diameter of the shaft is in the range of 1.1:1 to 2.1:1 and the ratio of the diameter of the circular openings to the baffle plate annular path length is in the range of 35:1 to 3:1.

3. A method of claim 2 in which said contacting apparatus is further characterized in that the ratio of the annular area of the opening around the shaft to the total cross sectional area of the contactor is from about 0.002:1 to about 0.02:1 with a feed rate to the contactor that develops average annular axial velocities of about 0.1 to about 10 cm per second.

4. A method of claims 1, 2, or 3 wherein said shaft has drive means connected thereto, said drive means external to said chambers, and said shell has means located in the chambers for inlet and outlet of material.

5. A method of claims 1, 2, or 3 wherein said shell is comprised of flanged sections and said baffles are discoidal plates secured within said flanged sections or between the flanges of said flange sections thereby forming discreet chambers.

6. A method of claim 5 wherein said chambers are of essentially equal volume.

7. A method of claim 5 wherein said flanged sections are equipped with heat exchange means.

8. A method of claims 1, 2, or 3 wherein at least some of the reactants are additionally introduced into chambers of the contactor other than said first chamber.

9. A method of claims 1, 2, or 3 wherein a least some of the reactants are additionally introduced into chambers of the contactor other than said first chamber.

10. A method of claims 1, 2, or 3 wherein reaction conditions in said chambers are controlled to give different temperatures in different chambers.

11. A method of claims 1, 2, or 3 wherein a gas, inert to the reaction, is introduced into said contactor in a quantity sufficient to provide a gas cap in the top of said reactor.

12. A method for continuous preparation of arylene sulfide polymer comprising (1) introducing a polyhalo-substituted aromatic compound and a composition chosen from among the group consisting of (i) sulfur-containing complex produced from a suitable sulfur source, alkali metal hydroxide, at least one organic amide and, optionally, at least one polymerization modifying compound and (ii) suitable sulfur source, alkali metal hydroxide, at least one organic amide and, optionally, at least one polymerization modifying compound into at least a first lower chamber in a contacting apparatus comprising (A) a cylindrical, vertically elongated shell having closed ends and separated by horizontal baffle plates into a multiplicity of discrete chambers with access from one chamber to another through concentric circular openings, axially centered in said baffles and (B) a continuous rotatable shaft extending concentric with said baffles within said shell with at least one agitator means attached thereto positioned in each chamber, said shaft and said circular openings providing annular openings such that the ratio of backflow rate to feed rate through the openings is less than 1.5:1

(2) passing said reaction mixture upward at a specified annular velocity through chambers of said contactor while maintaining each chamber within conditions for producing arylene sulfide polymers; and (3) recovering arylene sulfide polymer from a chamber of the contactor removed from the chamber into which reactants were introduced wherein the annular space between the rotatable shaft and the baffle plate annulus wall forming said circular opening is sized to provide an area of upward transport of a particulate matter while maintaining a backflow rate to feed rate ratio through said circular opening in a range less than 1.5:1.

13. A method for continuous preparation of arylene sulfide polymer according to claim 12 in which said contacting apparatus is further characterized in that the ratio of the diameter of the circular openings to the diameter of the shaft is in the range of 1.1:1 to 2:1 and the ratio of the diameter of the circular openings to the baffle plate annular path length is in the range of 35:1 to 3:1.

14. A method for continuous preparation of arylene sulfide polymer according to claim 13 wherein said contacting apparatus is further characterized in that the ratio of the annular area of the total cross sectional area of the contactor is from about 0.002:1 to about 0.2:1 with a feed rate to the contactor that develops average annular axial velocities of about 0.1 to about 10 cm per second.

* * * * *